United States Patent
Shimoda et al.

(10) Patent No.: US 9,968,109 B2
(45) Date of Patent: May 15, 2018

(54) GREEN TEA EXTRACT COMPOSITION

(71) Applicant: KAO CORPORATION, Tokyo (JP)

(72) Inventors: Yuichi Shimoda, Sumida-ku (JP); Yoshiaki Takahashi, Shimotsuke (JP)

(73) Assignee: KAO CORPORATION, Tokyo (JP)

( * ) Notice: Subject to any disclaimer, the term of this patent is extended or adjusted under 35 U.S.C. 154(b) by 0 days. days.

(21) Appl. No.: 15/021,117

(22) PCT Filed: Oct. 29, 2014

(86) PCT No.: PCT/JP2014/078685
§ 371 (c)(1),
(2) Date: Mar. 10, 2016

(87) PCT Pub. No.: WO2015/064600
PCT Pub. Date: May 7, 2015

(65) Prior Publication Data
US 2016/0219897 A1    Aug. 4, 2016

(30) Foreign Application Priority Data
Oct. 29, 2013 (JP) ................. 2013-224219

(51) Int. Cl.
| | | |
|---|---|---|
| A23F 3/40 | (2006.01) | |
| A23F 3/16 | (2006.01) | |
| A23F 3/38 | (2006.01) | |
| A23F 3/22 | (2006.01) | |

(52) U.S. Cl.
CPC ................ *A23F 3/38* (2013.01); *A23F 3/163* (2013.01); *A23F 3/22* (2013.01)

(58) Field of Classification Search
CPC .. A61K 2300/00; A61K 31/353; A61K 36/82; A61K 8/97; A61K 9/2018; A23V 2002/00; A23V 2250/214; A23V 2250/21; A23V 2250/628; A23V 2250/2108; A23V 2250/606; A23V 2250/1592; A23L 2/52; A23F 3/14; A23F 3/00; A23F 3/16; A23F 3/40
USPC ....................... 426/42, 597, 5, 103, 435, 655
See application file for complete search history.

(56) References Cited

U.S. PATENT DOCUMENTS

| | | | |
|---|---|---|---|
| 5,780,086 A * | 7/1998 | Kirksey ................. | A23F 3/163 426/330.3 |
| 6,063,428 A | 5/2000 | Ekanayake et al. | |
| 6,277,427 B1 * | 8/2001 | Husz ...................... | A23L 2/38 426/590 |
| 2006/0057261 A1 | 3/2006 | Ogura et al. | |
| 2006/0263454 A1 * | 11/2006 | Sugiyama ............... | A23F 3/20 424/729 |
| 2007/0048430 A1 | 3/2007 | Konishi et al. | |
| 2010/0316770 A1 | 12/2010 | Fukuda et al. | |
| 2012/0121761 A1 | 5/2012 | Fukuda et al. | |

FOREIGN PATENT DOCUMENTS

| | | |
|---|---|---|
| JP | 2001-197863 A | 7/2001 |
| JP | 2001-245591 A | 9/2001 |
| JP | 2005-58210 A | 3/2005 |
| JP | 2007-89576 A | 4/2007 |
| JP | 2008-178397 A | 8/2008 |
| JP | 2008-301808 A | 12/2008 |
| JP | 2012-115229 A | 6/2012 |
| JP | 2015-84726 A | 5/2015 |
| JP | 2015-116132 A | 6/2015 |
| KR | 10-2009-0102757 A | 9/2009 |
| TW | 200826851 A | 7/2008 |
| WO | WO 2004/037022 A1 | 5/2004 |
| WO | WO 2009/019876 A1 | 2/2009 |
| WO | WO 2016/174888 A1 | 11/2016 |

OTHER PUBLICATIONS

International Search Report dated Feb. 3, 2015 in PCT/JP2014/078685 filed Oct. 29, 2014.

* cited by examiner

*Primary Examiner* — Lien T Tran
*Assistant Examiner* — Hong T Yoo
(74) *Attorney, Agent, or Firm* — Oblon, McClelland, Maier & Neustadt, L.L.P.

(57) ABSTRACT

Provided is a green tea extract composition, comprising the following components (A), (B), (C), and (D): (A) non-polymer catechins; (B) a sugar; (C) iron; and (D) caffeine, the green tea extract composition having: a content of the non-polymer catechins (A) of from 25 to 45 mass %; a content of the sugar (B) of from 6 to 13 mass %; a mass ratio between the sugar (B) and the iron (C), [(C)/(B)], of from 0.000005 to 0.00016; a mass ratio between the sugar (B) and the caffeine (D), [(D)/(B)], of from 0.2 to 0.7; and a water content of 10 mass % or less.

15 Claims, No Drawings

GREEN TEA EXTRACT COMPOSITION

FIELD OF THE INVENTION

The present invention relates to a green tea extract composition.

BACKGROUND OF THE INVENTION

In general, a green tea extract containing a soluble tea component is formed by extracting green tea with hot water or cold water. A concentrated green tea extract or a purified green tea extract is formed by concentrating or purifying the green tea extract, and is generally stored in a frozen, refrigerated, or dried state.

For example, as a purified tea extract having improved feeling in the mouth and aftertaste, there is known a purified tea extract having a purity of non-polymer catechins in its solids of 50 mass % or more, a content of magnesium in the solids of 300 mg/kg or less, and a mass ratio between magnesium and manganese in the solids (manganese/magnesium) of 0.25 or less (Patent Document 1). In addition, as a green tea extract having improved clarity and color, there is known a green tea extract characterized by containing specific amounts of a catechin mixture, theanine, and calcium, magnesium, manganese, aluminum, zinc, and iron ions (Patent Document 2).

[Patent Document 1] JP-A-2012-115229
[Patent Document 2] JP-A-2001-197863

SUMMARY OF THE INVENTION

The present invention provides a green tea extract composition, comprising the following components (A), (B), (C), and (D): (A) non-polymer catechins; (B) a sugar; (C) iron; and (D) caffeine, the green tea extract composition having: a content of the non-polymer catechins (A) of from 25 to 45 mass; a content of the sugar (B) of from 6 to 13 mass %; a mass ratio between the sugar (B) and the iron (C), [(C)/(B)], of from 0.000005 to 0.00016; a mass ratio between the sugar (B) and the caffeine (D), [(D)/(B)], of from 0.2 to 0.7; and a water content of 10 mass % or less, a packaged beverage, comprising the green tea extract composition blended therein, and an instant beverage powder, comprising the green tea extract composition blended therein.

DETAILED DESCRIPTION OF THE INVENTION

The inventors of the present invention found that a green tea extract composition, when stored for a long period of time without being frozen or refrigerated, undergoes different phenomena, depending on its water content: the green tea extract composition becomes dark when the water content is high, whereas the green tea extract composition becomes reddish when the water content is low. In this connection, the present invention relates to a green tea extract composition having reduced residual feeling and bitterness in the mouth, and hardly exhibiting a change in color tone during storage. As used herein, the term "residual feeling" refers to an irritating taste unpleasant on the tongue with roughness of aggregated particles in the mouth.

As a result of their investigations, the inventors of the present invention found that a green tea extract composition having reduced residual feeling and bitterness, and hardly exhibiting a change in color tone during storage is obtained by controlling, to specific amounts, the respective contents of the non-polymer catechins and a specific component contained in the green tea extract composition, a quantitative ratio between the specific component and a specific metal, a quantitative ratio between the specific component and caffeine, and a water content.

According to the present invention, there can be provided a green tea extract composition having reduced residual feeling and bitterness, and hardly exhibiting a change in color tone during storage. Further, the green tea extract composition of the present invention is useful as a material for producing an easy-to-drink beverage without any unpleasant feeling by virtue of reduced residual feeling and bitterness in the mouth.

[Green Tea Extract Composition]

In the green tea extract composition of the present invention, the content of the non-polymer catechins (A), which is from 25 to 45 mass %, is preferably 27 mass % or more, more preferably 30 mass % or more, more preferably 33 mass % or more, even more preferably 35 mass % or more, from the viewpoints of maintenance of the taste and flavor of tea, and a physiological effect, and is preferably 44 mass % or less, more preferably 42 mass % or less, more preferably 40 mass % or less, even more preferably 38 mass % or less, from the viewpoints of reductions in bitterness and residual feeling, and suppression of a change in color tone. The content of the non-polymer catechins (A) in the green tea extract composition falls within the range of preferably from 27 to 44 mass %, more preferably from 30 to 42 mass %, more preferably from 33 to 40 mass %, even more preferably from 35 to 38 mass %. As used herein, the term "non-polymer catechins" is a collective term encompassing gallate forms including epigallocatechin gallate, gallocatechin gallate, epicatechin gallate, and catechin gallate, and non-gallate forms including epigallocatechin, gallocatechin, epicatechin, and catechin. It should be noted that the content of the non-polymer catechins is defined on the basis of the total amount of the above-mentioned eight kinds, and in the present invention, at least one out of the eight of non-polymer catechins is contained.

In the green tea extract composition of the present invention, the ratio of the gallate forms in the non-polymer catechins is preferably 30 mass % or more, more preferably 35 mass % or more, even more preferably 40 mass % or more, from the viewpoints of maintenance of the taste and flavor of tea, and a physiological effect, and is preferably 57 mass % or less, more preferably 56 mass or less, more preferably 55 mass % or less, even more preferably 54 mass % or less, from the viewpoints of reductions in bitterness and residual feeling. The ratio of the gallate forms falls within the range of preferably from 30 to 57 mass %, more preferably from 35 to 56 mass %, more preferably from 35 to 55 mass %, even more preferably from 40 to 54 mass %. As used herein, the term "ratio of gallate forms in the non-polymer catechins" refers to the mass ratio of the above-mentioned four of gallate forms to the eight of non-polymer catechins.

In addition, in the green tea extract composition of the present invention, the content of a sugar (B), which is from 6 to 13 mass %, is preferably 6.5 mass % or more, more preferably 7 mass % or more, even more preferably 8 mass % or more, from the viewpoints of reductions in residual feeling and bitterness, and is preferably 12.5 mass % or less, more preferably 12.3 mass % or less, even more preferably 12.1 mass % or less, from the viewpoint of maintenance of the taste and flavor of tea. The content of the sugar (B) in the green tea extract composition falls within the range of preferably from 6.5 to 12.5 mass %, more preferably from 7 to 12.3 mass %, even more preferably from 8 to 12.1 mass %. As used herein, the term "sugar" is a collective term encompassing glucose, fructose, and sucrose. It should be noted that the content of the sugar (B) defined on the basis of the total amount of the above-mentioned three kinds, and in the present invention, at least one out of the above-mentioned three kinds is contained.

In the green tea extract composition of the present invention, a mass ratio between the non-polymer catechins (A) and the sugar (B), [(B)/(A)], is preferably 0.1 or more, more preferably 0.19 or more, even more preferably 0.2 or more, from the viewpoints of reductions in residual feeling and bitterness, and is preferably 0.5 or less, more preferably 0.45 or less, even more preferably 0.4 or less, from the viewpoint of maintenance of the taste and flavor of tea. The mass ratio [(B)/(A)] falls within the range of preferably from 0.1 to 0.5, more preferably from 0.19 to 0.45, even more preferably from 0.2 to 0.4.

In addition, in the green tea extract composition of the present invention, from the viewpoint of a reduction in residual feeling, the content of iron (C) is preferably 0.00001 mass % or more, more preferably 0.0001 mass % or more, more preferably 0.00014 mass % or more, even more preferably 0.0002 mass % or more, and is preferably 0.0016 mass % or less, more preferably 0.0012 mass % or less, more preferably 0.001 mass % or less, more preferably 0.0009 mass % or less, even more preferably 0.0007 mass % or less. The content of the iron (C) in the green tea extract composition falls within the range of preferably from 0.00001 to 0.0016 mass %, more preferably from 0.0001 to 0.0012 mass %, more preferably from 0.00014 to 0.001 mass %, more preferably from 0.0002 to 0.0009 mass %, even more preferably from 0.0002 to 0.0007 mass %. In this connection, the "iron" contained in the green tea extract composition includes iron in a nonionic state and iron in a dissociated state, and the dissociated iron includes a divalent iron ion and a trivalent iron ion. It should be noted that the content of the iron (C) is defined on the basis of the total amount of the iron in a nonionic state and the iron in a dissociated state, and in the present invention, at least one out of the above-mentioned three kinds is contained.

In the green tea extract composition of the present invention, a mass ratio between the sugar (B) and the iron (C), [(C)/(B)], which is from 0.000005 to 0.00016, is preferably 0.00001 or more, more preferably 0.000015 or more, even more preferably 0.00002 or more, from the viewpoint of a reduction in bitterness, and is preferably 0.00014 or less, more preferably 0.00012 or less, more preferably 0.0001 or less, even more preferably 0.00007 or less, from the viewpoints of reductions in residual feeling and bitterness. The mass ratio [(C)/(B)] falls within the range of preferably from 0.00001 to 0.00014, more preferably from 0.000015 to 0.00012, more preferably from 0.00002 to 0.0001, even more preferably from 0.00002 to 0.00007.

The green tea extract composition of the present invention further contains caffeine (D). In the green tea extract composition of the present invention, the content of the caffeine (D) is preferably 2 mass % or more, more preferably 2.5 mass % or more, even more preferably 3 mass % or more, from the viewpoint of a reduction in residual feeling, and is preferably 6 mass % or less, more preferably 5.5 mass % or less, more preferably 5 mass % or less, even more preferably 4 mass % or less, from the viewpoints of reductions in residual feeling and bitterness. The content of the caffeine (D) in the green tea extract composition falls within the range of preferably from 2 to 6 mass %, more preferably from 2.5 to 5.5 mass %, more preferably from 3 to 5 mass %, even more preferably from 3 to 4 mass %.

In the green tea extract composition of the present invention, a mass ratio between the non-polymer catechins (A) and the caffeine (D), [(D)/(A)], is preferably 0.04 or more, more preferably 0.05 or more, even more preferably 0.06 or more, from the viewpoint of a reduction in residual feeling, and is preferably 0.17 or less, more preferably 0.16 or less, more preferably 0.14 or less, even more preferably 0.11 or less, from the viewpoints of suppression of a change in color tone, and reductions in residual feeling and bitterness. The mass ratio [(D)/(A)] falls within the range of preferably from 0.04 to 0.17, more preferably from 0.05 to 0.16, more preferably from 0.06 to 0.14, even more preferably from 0.06 to 0.11.

In addition, in the green tea extract composition of the present invention, a mass ratio between the sugar (B) and the caffeine (D), [(D)/(B)], which is from 0.2 to 0.7, is preferably 0.23 or more, more preferably 0.25 or more, more preferably 0.3 or more, even more preferably 0.35 or more, from the viewpoints of suppression of a change in color tone, and a reduction in residual feeling, and is preferably 0.65 or less, more preferably 0.6 or less, more preferably 0.55 or less, even more preferably 0.5 or less, from the viewpoints of reductions in residual feeling and bitterness. The mass ratio [(D)/(B)] falls within the range of preferably from 0.23 to 0.65, more preferably from 0.25 to 0.6, more preferably from 0.3 to 0.55, even more preferably from 0.35 to 0.5.

In addition, in the green tea extract composition of the present invention, a mass ratio between the iron (C) and the caffeine (D), [(C)/(D)], is preferably 0.00003 or more, more preferably 0.000035 or more, even more preferably 0.00004 or more, from the viewpoint of a reduction in bitterness, and is preferably 0.00045 or less, more preferably 0.0004 or less, more preferably 0.0003 or less, even more preferably 0.0002 or less, from the viewpoints of suppression of a change in color tone, and reductions in residual feeling and bitterness. The mass ratio [(C)/(D)] falls within the range of preferably from 0.00003 to 0.00045, more preferably from 0.000035 to 0.0004, more preferably from 0.00004 to 0.0003, even more preferably from 0.00004 to 0.0002.

A water content (E) in the green tea extract composition of the present invention, which is 10 mass % or less, is more preferably 8 mass % or less, more preferably 5 mass % or less, more preferably 4 mass % or less, even more preferably 3 mass % or less, from the viewpoint of suppression of a change in color tone during storage. When the water content (E) is 5 mass % or less, the green tea extract composition of the present invention has the form of powder, and hence can have enhanced storage stability as well as an excellent handling property. It should be noted that the lower limit of the water content (E) of the green tea extract composition according to the present invention is preferably 0.1 mass % or more, more preferably 1.5 mass % or more, from the viewpoint of suppression of a change in color tone during storage.

In addition, in the green tea extract composition of the present invention, a change in color tone during storage is suppressed. Specifically, the absolute value (Δa*) of a difference between the a* value of the green tea extract composition after storage at 55° C. for 14 days, and the a* value of the green tea extract composition before the start of the storage, for example, immediately after production can be set to preferably less than 6, more preferably less than 4, more preferably less than 3.5, more preferably 2 or less, more preferably 1.9 or less, even more preferably 1.8 or less.

The "a* value" used herein is one of the coordinate values representing hue and chroma in the expression of a color in an L*a*b* color system, and is a coordinate value representing chroma in a red direction. The L*a*b* color system also uses L*, which represents lightness, and b*, which is a coordinate value representing chroma in a yellow direction, and in the present invention, a*, which is most likely to manifest when the green tea extract composition undergoes a change in color tone, is specified. It should be noted that the change in color tone (Δa*) is measured in accordance with the description of "Measurement of Change in Color Tone" in Examples to be described later.

A production method for the green tea extract composition of the present invention may be any method. For example, a green tea extract composition in which the respective contents of the non-polymer catechins and the sugar contained in the green tea extract composition, the quantitative ratio between the sugar and each of iron and caffeine, and the water content are controlled to specific amounts may be produced by bringing hot water into contact with surfaces of raw tea leaves, then extracting the tea leaves with water, and subjecting the resultant green tea extract solution to solid-liquid separation, followed by concentration or drying so as to achieve a water content of 10 mass % or less.

(Raw Tea Leaves)

The term "raw tea leaves" used herein refers to tea leaves after plucking and before heat treatment, or tea leaves stored in a refrigerated or frozen state after plucking and before heat treatment. In addition, tea leaves as plucked (full leaves) are generally used as the raw tea leaves to be used in the present invention. Further, stems may be used as well as the tea leaves.

The raw tea leaves are not particularly limited as long as the raw tea leaves are from a generally cultivated tea variety, and one or two or more may be appropriately selected and used. With regard to the harvest season of the tea leaves, anyone of first-picked tea, second-picked tea, third-picked tea, and fourth-picked tea is permitted. In addition, as a plucking method, there may be given, for example, two-leaf picking, three-leaf picking, and normal picking.

(Hot Water Treatment)

The kind of the hot water not particularly limited, and for example, tap water, distilled water, ion-exchanged water, or natural water may be appropriately selected and used.

In addition, the temperature of the hot water is preferably from 60 to 99° C., more preferably from 70 to 97° C., even more preferably from 80 to 95° C., from the viewpoints of reductions in bitterness and residual feeling, and suppression of a change in color tone.

A method for the contact is not particularly limited as long as the surfaces of the raw tea leaves can be brought into contact with the hot water, and examples thereof may include a method involving immersing the raw tea leaves in the hot water, and a method involving supplying the raw tea leaves with the hot water in the form of a shower.

The amount of the hot water may be appropriately selected, depending on the contact method and the scale. For example, the mass ratio between the water and the raw tea leaves (water/raw tea leaves) is preferably from 5 to 40, more preferably from 10 to 35, even more preferably from 20 to 30. In addition, a period of time for which the contact with the hot water is performed is preferably from 10 to 300 seconds, more preferably from 30 to 270 seconds, even more preferably from 120 to 240 seconds, from the viewpoints of reductions in bitterness and residual feeling, and suppression of a change in color tone.

After the hot water treatment, water remaining on the surfaces of the tea leaves may be removed by shaking or the like, or may be lightly wiped off with waste cloth, paper, or the like. In addition, the tea leaves after the hot water treatment may be dried.

In addition, before the extraction, the tea leaves may be subjected to, for example, CTC processing, cutting treatment, or pulverization treatment to enhance the extraction efficiency of the non-polymer catechins. The term "CTC processing" used herein refers to processing in which crushing, tearing, and curling are performed at once, and the CTC processing may be performed using a CTC processing apparatus. The CTC processing is processing to be used for black tea, and is not generally performed for the processing of green tea. It should be noted that, in the present invention, a step of rubbing tea leaves, such as crumpling, is not necessarily needed.

(Extraction)

A known method, such as stirring extraction, column extraction, or drip extraction, may be adopted as a method for the extraction.

The temperature of the water to be used in the extraction is preferably from 25 to 100° C., more preferably 50 to 98° C., even more preferably from 55 to 92° C., from the viewpoint of the extraction efficiency of the non-polymer catechins.

In addition, the water to be used may be water similar to those described above, and of those, ion-exchanged water is preferred in terms of taste.

The amount of the water may be appropriately selected, depending on the extraction method, and for example, the mass ratio between the water and the raw tea leaves (water/raw tea leaves=bath ratio) is preferably from 1 to 50, more preferably from 2 to 45, even more preferably from 3 to 40. In addition, a period of time for which the extraction is performed varies, depending on the scale and the like, and is, for example, preferably from 5 to 60 minutes, more preferably from 10 to 40 minutes.

(Solid-Liquid Separation)

After the extraction, the resultant green tea extract solution is subjected to solid-liquid separation.

For the solid-liquid separation, for example, filtration, centrifugation, or membrane treatment may be appropriately selected, and one or a combination of two or more thereof may be performed. Of those, from the viewpoints of suppression of a change in color tone, and reductions in residual feeling and bitterness, membrane treatment is preferred, and treatment with a microfiltration membrane (MF membrane) is more preferred.

Conditions for the membrane treatment are, for example, as described below. A temperature is preferably from 5 to 70° C., more preferably from 10 to 60° C. A pressure condition is preferably from 30 to 400 kPa, more preferably from 50 to 350 kPa. A pore size of membrane is preferably from 0.1 to 10 μm, more preferably from 0.2 to 5 μm. It should be noted that a measurement method for the pore size of membrane is exemplified by a general measurement method involving using a mercury intrusion method, a bubble point test, a bacterial filtration method, or the like, and it is preferred to use a value determined by a bubble point test.

For example, a hydrocarbon-based polymer, a fluorinated hydrocarbon-based polymer or a sulfone-based polymer, and a ceramic are given as a material for the membrane. In addition, for example, a flat membrane, a spiral membrane, a hollow fiber membrane, a monolith-type membrane, and a pencil-type membrane are given as a form of the membrane.

For the centrifugation, a general device of, for example, a separation plate type, a cylinder type, or a decanter type may be used. Conditions for the centrifugation are as described below. A temperature is preferably from 5 to 70° C., more preferably from 10 to 40° C. The number of revolutions and a period of time are, for example, in the case of the separation plate type, preferably from 4,000 to 10,000 rpm, more preferably from 5,000 to 10,000 rpm, even more preferably from 6,000 to 10,000 rpm, and preferably from 0.2 to 30 minutes, more preferably from 0.2 to 20 minutes, even more preferably from 0.2 to 15 minutes.

For the filtration, for example, filter separation with filter paper, a filter made of a metal, such as stainless steel, or the like may be adopted. The mesh size of the filter made of a metal is, for example, from 18 to 300 mesh.

(Concentration/Drying)

Examples of the form of the green tea extract composition include various forms such as a liquid, a slurry, a semi-solid, and a solid. In the case where a liquid is desired as the product form of the green tea extract composition, for example, it may be concentrated by reduced-pressure concentration, reverse osmosis membrane concentration, or the like, and a specific example of the reduced-pressure concentration may be an evaporator. In addition, in the case where powder is desired, for example, it may be powdered by being dried through spray drying, freeze-drying, or the like, which may be performed in combination with concentration. In this case, the water content is adjusted so as to be as described above.

[Packaged Beverage]

A packaged beverage of the present invention comprises the above-mentioned green tea extract composition blended therein.

The blending amount of the green tea extract composition in the beverage may be appropriately selected, and for example, the green tea extract composition may be blended so that the content of the non-polymer catechins (A) in the packaged beverage preferably from 0.1 to 0.3 mass %, more preferably from 0.12 to 0.2 mass %. In this case, dilution may be performed with water, another tea extract, or the like so as to achieve a desired amount of the non-polymer catechins. Examples of the water include the same types of water as those described above, and of those, ion-exchanged water is preferred in terms of taste. The pH (25° C.) of the packaged beverage is preferably from 2 to 7, more preferably from 2.5 to 6.5, even more preferably from 3 to 6.

The packaged beverage of the present invention may be a tea beverage or a non-tea-based beverage. Examples of the tea beverage include a green tea beverage, an oolong tea beverage, and a black tea beverage. In addition, examples of the non-tea-based beverage include: non-alcohol beverages, such as a fruit juice, a vegetable juice, a sports beverage, an isotonic beverage, enhanced water, bottled water, near water, a coffee beverage, an energy drink, and a drink for beauty; and alcohol beverages, such as beer, wine, Japanese sake, a plum liquor, a sparkling liquor, whisky, brandy, a clear liquor, rum, gin, and a liqueur. It should be noted that the form of the beverage is not particularly limited, and may be any of liquid, gel, or slurry forms and the like as long as the form is easily consumed.

The packaged beverage of the present invention may further comprise one or a combination of two or more of additives, such as a flavor, a vitamin, a mineral, an antioxidant, various esters, pigments, an emulsifier, a preservative, a seasoning, an acidulant, a fruit juice extract, a vegetable extract, a nectar extract, and a quality stabilizer. The content of each of those additives may be appropriately set to the extent that the object of the present invention is not impaired.

In addition, the packaged beverage of the present invention may be provided as a packaged beverage by filling a conventional package, such as a molded container formed of polyethylene terephthalate as a main component (a so-called PET bottle), a metal can, a paper package in combination with metal foil or a plastic film, and a bottle, with the beverage.

In addition, the packaged beverage of the present invention may be subjected to heat sterilization, and a method for the heat sterilization is not particularly limited as long as the method complies with a condition specified by an applicable regulation (Food Sanitation Act in Japan). Examples of the method may include a retort sterilization method, a high-temperature short-time sterilization method (HTST method), and an ultrahigh-temperature sterilization method (UHT method). In addition, the method for the heat sterilization may be appropriately selected, depending on the kind of the container for the packaged beverage. For example, when a container filled with a beverage can be subjected to heat sterilization as it is, like a metal can, retort sterilization may be adopted. Meanwhile, when a container such as a PET bottle or a paper container, which cannot be subjected to retort sterilization, is used, there may be adopted: aseptic filling, which involves subjecting a beverage to heat sterilization in advance under the same sterilization conditions as those described above and filling the beverage into a container having been subjected to sterilization treatment in an aseptic environment; or hot-pack filling.

[Instant Beverage Powder]

An instant beverage powder of the present invention comprises the above-mentioned green tea extract composition blended therein, and is drunk as a from-concentrate beverage by being dissolved in a liquid, such as water. Examples of the water may include ion-exchanged water, distilled water, natural water, and tap water. The temperature of the water may be appropriately selected, and is, for example, from 5 to 100° C. The concept of the "instant beverage powder" used herein encompasses an instant green tea beverage powder, an instant black tea beverage powder, an instant oolong tea beverage powder, and the like. The term "instant green tea beverage powder" refers to an instant beverage powder containing the above-mentioned green tea extract composition and, as desired, a green tea flavor, and the term "instant black tea beverage powder" refers to an instant beverage powder containing the above-mentioned green tea extract composition, as well as a black tea extract and/or a black tea flavor. In addition, the term "instant oolong tea beverage powder" refers to an instant beverage powder containing the above-mentioned green tea extract composition, as well as an oolong tea extract and/or an oolong tea flavor.

The blending amount of the green tea extract composition in the instant beverage powder may be appropriately selected. For example, the green tea extract composition may be blended so that the content of the non-polymer catechins per 3 g of the instant beverage powder is preferably from 280 to 1,200 mg, more preferably from 400 to 1,200 mg, more preferably from 450 to 1,000 mg, even more preferably from 500 to 800 mg. Specifically, the content of the green tea extract composition in the instant beverage powder is preferably from 60 to 10 mass %, more preferably from 50 to 15 mass %.

The instant beverage powder of the present invention may contain a dextrin. The content of the dextrin is an amount which is preferably from 0.1 to 15 times, more preferably from 0.5 to 12 times, even more preferably from 1 to 11 times as large as the mass of the green tea extract composition in the instant beverage powder.

The instant beverage powder of the present invention may contain ascorbic acid and/or a salt thereof. The salt is not particularly limited as long as the salt is physiologically acceptable, and is preferably an alkali metal salt, such as a potassium salt or a sodium salt, more preferably a sodium salt. The content of the ascorbic acid and/or the salt thereof is an amount which is preferably from 0.1 to 15 times, more preferably from 0.5 to 12 times, even more preferably from 1 to 11 times as large as the mass of the green tea extract composition in the instant beverage powder.

The instant beverage powder of the present invention may further contain one or two or more of additives, such as a sweetener, an antioxidant, a flavor, a fruit juice extract, a fruit piece, fruit powder, a herb, an organic acid, an organic acid salt, an inorganic acid, an inorganic acid salt, a mineral salt, a pH adjuster, and a quality stabilizer, as desired. It should be noted that the blending amount of each of those additives may be appropriately set to the extent that the object of the present invention is not impaired.

The instant beverage powder of the present invention may adopt an appropriate form, and an example thereof may be such a form that a small portion of the instant beverage powder required for a cup is packed. It should be noted that the volume of the cup is preferably from 100 to 320 mL, and the volume of the content packed in a small port ion may be appropriately set so as to be suitable for the volume of the cup.

The solids of the instant beverage powder of the present invention is preferably 90 mass % or more, more preferably 95 mass % or more, even more preferably 96 mass % or more, from the viewpoints of preservation, microbe prevention, and handling. It should be noted that the upper limit of the solids of the instant beverage powder is not particularly limited. The term "solids" used herein refers to a residue obtained by removing volatile substances by drying the instant beverage powder in an electric constant-temperature dryer at 105° C. for 3 hours.

The instant beverage powder of the present invention may be produced by an appropriately method, and for example, may be produced by mixing the above-mentioned green tea extract composition with any other component as desired, followed, as necessary, by a process including a known granulation method.

The present invention further discloses the following green tea extract composition, packaged beverage, and instant beverage powder regarding the embodiments described above.

<1>

A green tea extract composition, comprising the following components (A), (B), (C), and (D): (A) the non-polymer catechins; (B) a sugar; (C) iron; and (D) caffeine, the green tea extract composition having: a content of the non-polymer catechins (A) of from 25 to 45 mass %; a content of the sugar (B) of from 6 to 13 mass %; amass ratio between the sugar (B) and the iron (C), [(C)/(B)], of from 0.000005 to 0.00016; a mass ratio between the sugar (B) and the caffeine (D), [(D)/(B)], of from 0.2 to 0.7; and a water content of 10 mass % or less.

<2>

The green tea extract composition according to the above-mentioned item <1>, wherein the content of the non-polymer catechins (A) is preferably 27 mass % or more, more preferably 30 mass % or more, more preferably 33 mass % or more, even more preferably 35 mass % or more, and is preferably 44 mass % or less, more preferably 42 mass % or less, more preferably 40 mass % or less, even more preferably 38 mass % or less.

<3>

The green tea extract composition according to the above-mentioned item <1> or 0.2>, wherein the content of the non-polymer catechins (A) is preferably from 27 to 44 mass %, more preferably from 30 to 42 mass %, more preferably from 33 to 40 mass %, even more preferably from 35 to 38 mass %.

<4>

The green tea extract composition according to any one of the above-mentioned items <1> to <3>, wherein the ratio of gallate forms in the non-polymer catechins is preferably 30 mass % or more, more preferably 35 mass % or more, even more preferably 40 mass % or more, and is preferably 57 mass % or less, more preferably 56 mass % or less, more preferably 55 mass % or less, even more preferably 54 mass % or less.

<5>

The green tea extract composition according to any one of the above-mentioned items <1> to <4>, wherein the ratio of gallate forms in the non-polymer catechins is preferably from 30 to 57 mass %, more preferably from 35 to 56 mass %, more preferably from 35 to 55 mass %, even more preferably from 40 to 54 mass %.

<6>

The green tea extract composition according to any one of the above-mentioned items <1> to <5>, wherein the non-polymer catechins (A) are at least one selected from the group consisting of epigallocatechin gallate, gallocatechin gallate, epicatechin gallate, catechin gallate, epigallocatechin, gallocatechin, epicatechin, and catechin.

<7>

The green tea extract composition according to any one of the above-mentioned items <1> to <6>, wherein the content of the sugar (B) is preferably 6.5 mass % or more, more preferably 7 mass % or more, even more preferably 8 mass % or more, and is preferably 12.5 mass % or less, more preferably 12.3 mass % or less, even more preferably 12.1 mass % or less.

<8>

The green tea extract composition according to any one of the above-mentioned items <1> to <7>, wherein the content of the sugar (B) is preferably from 6.5 to 12.5 mass %, more preferably from 7 to 12.3 mass %, even more preferably from 8 to 12.1 mass %.

<9>

The green tea extract composition according to any one of the above-mentioned items <1> to <8>, wherein the sugar is at least one selected from the group consisting of glucose, fructose, and sucrose.

<10>

The green tea extract composition according to any one of the above-mentioned items <1> to <9>, wherein a mass ratio between the non-polymer catechins (A) and the sugar (B), [(B)/(A)], is preferably 0.1 or more, more preferably 0.19 or more, even more preferably 0.2 or more, and is preferably 0.5 or less, more preferably 0.45 or less, even more preferably 0.4 or less.

<11>

The green tea extract composition according to any one of the above-mentioned items <1> to <10>, wherein a mass ratio between the non-polymer catechins (A) and the sugar (B), [(B)/(A)], is preferably from 0.1 to 0.5, more preferably from 0.19 to 0.45, even more preferably from 0.2 to 0.4.

<12>
The green tea extract composition according to any one of the above-mentioned items <1> to <11>, wherein the content of the iron (C) is preferably 0.00001 mass % or more, more preferably 0.0001 mass % or more, more preferably 0.00014 mass % or more, even more preferably 0.0002 mass % or more, and is preferably 0.0016 mass % or less, more preferably 0.0012 mass % or less, more preferably 0.001 mass % or less, more preferably 0.0009 mass % or less, even more preferably 0.0007 mass % or less.

<13>
The green tea extract composition according to any one of the above-mentioned items <1> to <12>, wherein the content of the iron (C) is preferably from 0.00001 to 0.0016 mass %, more preferably from 0.0001 to 0.0012 mass %, more preferably from 0.00014 to 0.001 mass %, more preferably from 0.0002 to 0.0009 mass %, even more preferably from 0.0002 to 0.0007 mass %.

<14>
The green tea extract composition according to any one of the above-mentioned items <1> to <13>, wherein the mass ratio between the sugar (B) and the iron (C), [(C)/(B)], is preferably 0.00001 or more, more preferably 0.000015 or more, even more preferably 0.00002 or more, and is preferably 0.00014 or less, more preferably 0.00012 or less, more preferably 0.0001 or less, even more preferably 0.00007 or less.

<15>
The green tea extract composition according to any one of the above-mentioned items <1> to <14>, wherein the mass ratio between the sugar (B) and the iron (C), [(C)/(B)], is preferably from 0.00001 to 0.00014, more preferably from 0.000015 to 0.00012, more preferably from 0.00002 to 0.0001, even more preferably from 0.00002 to 0.00007.

<16>
The green tea extract composition according to any one of the above-mentioned items <1> to <15>, wherein the content of the caffeine (D) is preferably 2 mass % or more, more preferably 2.5 mass % or more, even more preferably 3 mass % or more, and is preferably 6 mass % or less, more preferably 5.5 mass % or less, more preferably 5 mass % or less, even more preferably 4 mass % or less.

<17>
The green tea extract composition according to any one of the above-mentioned items <1> to <16>, wherein the content of the caffeine (D) is preferably from 2 to 6 mass %, more preferably from 2.5 to 5.5 mass %, more preferably from 3 to 5 mass %, even more preferably from 3 to 4 mass %.

<18>
The green tea extract composition according to any one of the above-mentioned items <1> to <17>, wherein a mass ratio between the non-polymer catechins (A) and the caffeine (D), [(D)/(A)], is preferably 0.04 or more, more preferably 0.05 or more, even more preferably 0.06 or more, and is preferably 0.17 or less, more preferably 0.16 or less, more preferably 0.14 or less, even more preferably 0.11 or less.

<19>
The green tea extract composition according to any one of the above-mentioned items <1> to <18>, wherein a mass ratio between the non-polymer catechins (A) and the caffeine (D), [(D)/(A)], preferably from 0.04 to 0.17, more preferably from 0.05 to 0.16, more preferably from 0.06 to 0.14, even more preferably from 0.06 to 0.11.

<20>
The green tea extract composition according to any one of the above-mentioned items <1> to <19>, wherein the mass ratio between the sugar (B) and the caffeine (D), [(D)/(B)], is preferably 0.23 or more, more preferably 0.25 or more, more preferably 0.3 or more, even more preferably 0.35 or more, and is preferably 0.65 or less, more preferably 0.6 or less, more preferably 0.55 or less, even more preferably 0.5 or less.

<21>
The green tea extract composition according to any one of the above-mentioned items <1> to <20>, wherein the mass ratio between the sugar (B) and the caffeine (D), [(D)/(B)], is preferably from 0.23 to 0.65, more preferably from 0.25 to 0.6, more preferably from 0.3 to 0.55, even more preferably from 0.35 to 0.5.

<22>
The green tea extract composition according to any one of the above-mentioned items <1> to <21>, wherein a mass ratio between the iron (C) and the caffeine (D), [(C)/(D)], is preferably 0.00003 or more, more preferably 0.000035 or more, even more preferably 0.00004 or more, and is preferably 0.00045 or less, more preferably 0.0004 or less, more preferably 0.0003 or less, even more preferably 0.0002 or less.

<23>
The green tea extract composition according to any one of the above-mentioned items <1> to <22>, wherein a mass ratio between the iron (C) and the caffeine (D), [(C)/(D)], is preferably from 0.00003 to 0.00045, more preferably from 0.000035 to 0.0004, more preferably from 0.00004 to 0.0003, even more preferably from 0.00004 to 0.0002.

<24>
The green tea extract composition according to any one of the above-mentioned items <1> to <23>, wherein the water content (E) preferably 8 mass % or less, more preferably 5 mass % or less, more preferably 4 mass % or less, even more preferably 3 mass % less, and is preferably 0.1 mass % or more, more preferably 1.5 mass % or more.

<25>
The green tea extract composition according to any one of the above-mentioned items <1> to <24>, wherein the water content (E) is preferably from 0.1 to 10 mass %, more preferably from 0.1 to 8 mass %, more preferably from 0.1 to 5 mass %, more preferably from 1.5 to 4 mass %, even more preferably from 1.5 to 3 mass %.

<26>
The green tea extract composition according to any one of the above-mentioned items <1> to <25>, wherein the absolute value ($\Delta a^*$) of a difference between the a* value of the green tea extract composition after storage at 55° C. for 14 days, and the a* value of the green tea extract composition before the start of the storage, for example, immediately after production is preferably less than 6, more preferably less than 4, more preferably less than 3.5, more preferably 2 or less, more preferably 1.9 or less, even more preferably 1.8 or less.

<27>
A packaged beverage, comprising the green tea extract composition of any one of the above-mentioned items <1> to <26> blended therein.

<28>
The packaged beverage according to the above-mentioned item <27>, wherein the green tea extract composition is blended so that the content of the non-polymer catechins (A) in the packaged beverage is preferably from 0.1 to 0.3 mass %, more preferably from 0.12 to 0.2 mass %.

<29>
The packaged beverage according to the above-mentioned item <27> or <28>, which is preferably a tea beverage or a non-tea-based beverage.
<30>
The packaged beverage according to the above-mentioned item <29>, wherein the tea beverage is preferably a green tea beverage, an oolong tea beverage, or a black tea beverage.
<31>
The packaged beverage according to the above-mentioned item <29>, wherein the non-tea-based beverage is preferably a fruit juice, a vegetable juice, a sports beverage, an isotonic beverage, enhanced water, bottled water, near water, a coffee beverage, an energy drink, a drink for beauty, or an alcohol beverage.
<32>
The packaged beverage according to any one of the above-mentioned items <27> to <31>, wherein the pH (25° C.) of the packaged beverage is preferably from 2 to 7, more preferably from 2.5 to 6.5, even more preferably from 3 to 6.
<33>
The packaged beverage according to any one of the above-mentioned items <27> to <32>, which is preferably filled into a molded container formed of polyethylene terephthalate as a main component (a so-called PET bottle), a metal can, a paper package in combination with metal foil or a plastic film, or a bottle.
<34>
The packaged beverage according to any one of the above-mentioned items <27> to <33>, which is preferably subjected to heat sterilization.
<35>
The packaged beverage according to the above-mentioned item <34>, wherein the heat sterilization preferably complies with a condition specified by an applicable regulation (Food Sanitation Act in Japan), and is more preferably retort sterilization, high-temperature short-time sterilization (HTST), or ultrahigh-temperature sterilization (UHT).
<36>
An instant beverage powder, comprising the green tea extract composition of any one of the above-mentioned items <1> to <26> blended therein.
<37>
The instant beverage powder according to the above-mentioned item <36>, wherein the instant beverage powder is preferably an instant green tea beverage powder, an instant black tea beverage powder, or an instant oolong tea beverage powder.
<38>
The instant beverage powder according to the above-mentioned item <36> or <37>, wherein the green tea extract composition is blended so that the content of the non-polymer catechins (A) per 3 g of the instant beverage powder is preferably from 280 to 1,200 mg, more preferably from 400 to 1,200 mg, more preferably from 450 to 1,000 mg, even more preferably from 500 to 800 mg.
<39>
The instant beverage powder according to any one of the above-mentioned items <36> to <38>, preferably further comprising a dextrin.
<40>
The instant beverage powder according to the above-mentioned item <39>, wherein the content of the dextrin is an amount which is preferably from 0.1 to 15 times, more preferably from 0.5 to 12 times, even more preferably from 1 to 11 times as large as the mass of the green tea extract composition in the instant beverage powder.
<41>
The instant beverage powder according to any one of the above-mentioned items <36> to <40>, preferably further comprising ascorbic acid and/or a salt thereof.
<42>
The instant beverage powder according to the above-mentioned item <41>, wherein the content of the ascorbic acid and/or the salt thereof is an amount which is preferably from 0.1 to 15 times, more preferably from 0.5 to 12 times, even more preferably from 1 to 11 times as large as the mass of the green tea extract composition in the instant beverage powder.
<43>
The instant beverage powder according to any one of the above-mentioned items <36> to <42>, preferably further comprising one or two or more of additives selected from the group consisting of a sweetener, an antioxidant, a flavor, a fruit juice extract, a fruit piece, fruit powder, a herb, an organic acid, an organic acid salt, an inorganic acid, an inorganic acid salt, a mineral salt, a pH adjuster, and a quality stabilizer.
<44>
The instant beverage powder according to any one of the above-mentioned items <36> to <43>, wherein the instant beverage powder preferably has such a form that a small portion of the instant beverage powder required for a cup is packed.
<45>
The instant beverage powder according to any one of the above-mentioned items <36> to <44>, wherein the solids of the instant beverage powder is preferably 90 mass % or more, more preferably 95 mass % or more, even more preferably 96 mass % or more.

EXAMPLES

1. Analysis of Non-Polymer Catechins and Caffeine

A sample dissolved and diluted with pure water was measured by a gradient method using a high-performance liquid chromatograph (model SCL-10AVP) manufactured by Shimadzu Corporation having mounted thereon an octadecyl group-introduced packed column for liquid chromatography (L-Column™ ODS, 4.6 mmφ×250 mm: manufactured by Chemicals Evaluation and Research Institute, Japan) at a column temperature of 35° C. The measurement was carried out using a distilled water solution containing 0.1 mol/L acetic acid as a mobile phase solution A and an acetonitrile solution containing 0.1 mol/L acetic acid as a mobile phase solution B under the conditions of a flow rate of 1 mL/min, a sample injection volume of 10 µL, and a UV detector wavelength of 280 nm. It should be noted that the gradient conditions are as described below.
Concentration Gradient Condition (Vol %)

| Time | Solution A concentration | Solution B concentration |
|---|---|---|
| 0 min | 97% | 3% |
| 5 min | 97% | 3% |
| 37 min | 80% | 20% |
| 43 min | 80% | 20% |
| 43.5 min | 0% | 100% |

-continued

| Time | Solution A concentration | Solution B concentration |
|---|---|---|
| 48.5 min | 0% | 100% |
| 49 min | 97% | 3% |
| 60 min | 97% | 3% |

2. Measurement of Sugar

1) Preparation of Sample

A sample was diluted with pure water, and then the dilution was sequentially passed through 0.5 g of a silica-based packing material (BONDELUTE C18, manufactured by Varian Inc.), 0.5 g of a strongly basic anion-exchange resin (SAX, manufactured by Varian Inc.), and 0.5 g of a strongly acidic cation-exchange resin (SCX, manufactured by Varian Inc.). Thus, a sample was prepared.

2) Measurement Apparatus

A high-performance liquid chromatograph (D-2000, manufactured by Hitachi, Ltd.) was used.

3) Measurement Conditions

A strong anion-exchanged column (TSKgel Suger Axi, manufactured by Tosoh Corporation) was mounted onto the high-performance chromatograph, and measurement was performed at a column temperature 70° C. by a post-column reaction method. A distilled water solution containing 0.5 mol/L boric acid was used as a mobile phase solution, and a flow rate and a sample injection volume were set to 0.4 mL/min and 10 μL, respectively. In addition, a distilled water solution containing 1% of arginine and of boric acid was used as a post-column reaction reagent, and a reaction was performed at 150° C. A detector used was a fluorescence detector, and the conditions were as follows: an excitation wavelength of 320 nm and a fluorescence detection wavelength of 430 nm.

3. Analysis of Iron

A sample was dissolved and diluted with a 0.1 M nitric acid aqueous solution, and then subjected to measurement by a graphite furnace method using anatomic absorption spectrophotometer (Z-2000, manufactured by Hitachi, Ltd.). 20 μL of the diluted sample was dried at from 80 to 140° C. for 40 seconds, ashed at 500° C. for 20 seconds, and atomized at 2,200° C. for 5 seconds. Then, measurement was performed at a measurement wavelength of 248.3 nm with a slit of 0.2 mm.

4. Measurement of Water Content

About 1 g of a sample was weighed and dried at 105° C. for 3 hours, and the sample after the drying was weighed. A water content (mass) was calculated from the mass of the sample before the drying and that after the drying.

5. Measurement of Change in Color Tone

A powdered or paste sample was placed in a 30φ circular cell and measured for its a* value in the L*a*b* color system with a spectrophotometer (model: Color Meter ZE-2000, manufactured by Nippon Denshoku Industries Co., Ltd.). The absolute value (Δa*) of a difference between the a* value of a green tea extract composition after storage at 55° C. for 14 days, and the a* value of the green tea extract composition immediately after production was determined.

6. Sensory Evaluation

Each packaged beverage was drunk by an expert panel of four members and evaluated for its residual feeling and bitterness in accordance with the criteria described below, and then final scores were determined through discussion.

Evaluation Criteria for Residual Feeling

Evaluation was performed on a 5-point scale with the score of the residual feeling of a packaged beverage of Example 1 being defined as "1" and the score of the residual feeling of a packaged beverage of Comparative Example 2 being defined as "5". Specific evaluation criteria are as follows.

5: Residual feeling is strongly sensed.
4: Residual feeling is sensed.
3: Residual feeling is slightly sensed.
2: Residual feeling is hardly sensed.
1: No residual feeling is sensed.

Evaluation Criteria for Bitterness

Evaluation was performed on a 5-point scale with the score of the bitterness of the packaged beverage of Example 1 being defined as "1" and the score of the bitterness of the packaged beverage of Comparative Example 2 being defined as "5". Specific evaluation criteria are as follows.

5: Bitterness is strongly sensed.
4: Bitterness is sensed.
3: Bitterness is slightly sensed.
2: Bitterness is hardly sensed.
1: No bitterness is sensed.

Example 1

A green tea extract composition was produced by the following procedure.

Hot Water Treatment

Plucked raw tea leaves were immersed in ion-exchanged water at 90° C. for 210 seconds and then filtered with a metal mesh, and the washing solution of tea leaf was discarded. The amount of the ion-exchanged water used was 25 in terms of mass ratio of hot water/raw tea leaves.

CTC Processing

The tea leaves which had been immersed in the hot water were drained off water, subjected to crushing, tearing, and curling (CTC) processing, and dried to provide the dried tea leaves.

Extraction

The dried tea leaves were subjected to stirring extraction with ion-exchanged water at 60° C. for 10 minutes, and then filtered with a metal mesh to provide a green tea extract solution A. The amount of the ion-exchanged water used was 120 in terms of mass ratio of water/raw tea leaves.

Solid-Liquid Separation

A pencil-type module (manufactured by Asahi Kasei Chemicals Corporation, pore size: 0.2 μm, material: polyvinylidene fluoride) as a microfiltration module was mounted, and the resultant green tea extract solution A was subjected to pressure filtration at a gauge pressure of 100 kPa and a temperature of 25° C. to provide a green tea extract solution B.

Concentration/Spray Drying

The resultant green tea extract solution B was concentrated in an evaporator, and then a green tea extract composition was obtained through the use of a spray dryer.

The resultant powdered green tea extract composition was analyzed. In addition, the powdered green tea extract composition was diluted with ion-exchanged water so as to have a concentration of the non-polymer catechins of 0.175 g/100 mL, and then the resultant was filled into a container and sterilized at 138° C. for 30 seconds to prepare a packaged beverage, which was subjected to the sensory evaluation. The results are collectively shown in Table 1.

Example 2

A powdered green tea extract composition was obtained by the same procedure as in Example 1 except that, in Example 1, the immersion time in the hot water was changed to 240 seconds. After that, the resultant powdered green tea extract composition was analyzed, and then a packaged beverage was prepared by the same procedure as in Example 1, and subjected to the sensory test. The results are shown in Table 1.

Example 3

A powdered green tea extract composition was obtained by the same procedure as in Example 1 except that, in Example 1, the immersion time in the hot water was changed to 140 seconds. After that, the resultant powdered green tea extract composition was analyzed, and then a packaged beverage was prepared by the same procedure as in Example 1, and subjected to the sensory test. The results are shown in Table 1.

Example 4

A powdered green tea extract composition was obtained by the same procedure as in Example 1 except that, in Example 1, the immersion time in the hot water was changed to 40 seconds. After that, the resultant powdered green tea extract composition was analyzed, and then a packaged beverage was prepared by the same procedure as in Example 1, and subjected to the sensory test. The results are shown in Table 1.

Example 5

A powdered green tea extract composition was obtained by the same procedure as in Example 1 except that, in Example 1, the immersion time in the hot water was changed to 20 seconds. After that, the resultant powdered green tea extract composition was analyzed, and then a packaged beverage was prepared by the same procedure as in Example 1, and subjected to the sensory test. The results are shown in Table 1.

Example 6

A powdered green tea extract composition was obtained by the same procedure as in Example 1 except that, in Example 1, the immersion e in the hot water was changed to 150 seconds and the extraction temperature was changed to 90° C. After that, the resultant powdered green tea extract composition was analyzed, and then a packaged beverage was prepared by the same procedure as in Example 1, and subjected to the sensory test. The results are shown in Table 1.

Example 7

A powdered green tea extract composition was obtained by the same procedure as in Example 6 except that, in Example 6, the extraction temperature was changed to 75° C. After that, the resultant powdered green tea extract composition was analyzed, and then a packaged beverage was prepared by the same procedure as in Example 1, and subjected to the sensory test. The results are shown in Table 1.

Example 8

A powdered green tea extract composition was obtained by the same procedure as in Example 6 except that, in Example 6, the extraction temperature was changed to 60° C. After that, the resultant powdered green tea extract composition a analyzed, and then a packaged beverage was prepared by the same procedure as in Example 1, and subjected to the sensory test. The results are shown in Table 1.

Example 9

A powdered green tea extract composition was obtained by the same procedure as in Example 1 except that, in Example 1, the extraction temperature was changed to 80° C. After that, the resultant powdered green tea extract composition was analyzed, and then a packaged beverage was prepared by the same procedure as in Example 1, and subjected to the sensory test. The results are shown in Table 1.

Example 10

A powdered green tea extract composition as obtained by the same procedure as in Example 1 except that, in Example 1, the extraction temperature was changed to 90° C. After that, the resultant powdered green tea extract composition was analyzed, and then a packaged beverage was prepared by the same procedure as in Example 1, and subjected to the sensory test. The results are shown in Table 1.

Example 11

A powdered green tea extract composition was obtained by the same procedure as in Example 6 except that, in Example 6, the pencil-type module (manufactured by Asahi Kasei Chemicals Corporation) as the microfiltration module to be used in the solid-liquid separation was changed to one having a pore size of 0.25 μm and using polyolefin as its material. After that, the resultant powdered green tea extract composition was analyzed, and then a packaged beverage was prepared by the same procedure as in Example 1, and subjected to the sensory test. The results are shown in Table 1.

Example 12

A powdered green tea extract composition was obtained by the same procedure as in Example 11 except that, in Example 11, the extraction temperature was changed to 30° C. After that, the resultant powdered green tea extract composition was analyzed, and then a packaged beverage was prepared by the same procedure as in Example 1, and subjected to the sensory test. The results are shown in Table 1.

Example 13

A powdered green tea extract composition was obtained by the same procedure as in Example 12 except that, in Example 12, fructose was added to the green tea extract solution obtained through the filtration. After that, the resultant powdered green tea extract composition was analyzed, and then a packaged beverage was prepared by the same procedure as in Example 1, and subjected to the sensory test. The results are shown in Table 1.

Example 14

A powdered green tea extract composition was obtained by the same procedure as in Example 1 except that, in Example 1, the extraction time was changed to 20 minutes. After that, the resultant powdered green tea extract composition was analyzed, and then a packaged beverage was prepared by the same procedure as in Example 1, and subjected to the sensory test. The results are shown in Table 1.

Example 15

A powdered green tea extract composition was obtained by the same procedure as in Example 6 except that, in Example 6, the extraction temperature was changed to 5° C., the extraction time was changed to 20 hours, and the pencil-type module (manufactured by Asahi Kasei Chemicals Corporation) as the microfiltration module to be used in the solid-liquid separation was changed to one having a pore size of 0.25 µm and using polyolefin as its material. After that, the resultant powdered green tea extract composition was analyzed, and then a packaged beverage was prepared by the same procedure as in Example 1, and subjected to the sensory test. The results are shown in Table 1.

Comparative Example 1

A powdered green tea extract composition was obtained by the same procedure as in Example 4 except that, in Example 4, the extraction temperature was changed to 95° C. After that, the resultant powdered green tea extract composition was analyzed, and then a packaged beverage was prepared by the same procedure as in Example 1, and subjected to the sensory test. The results are shown in Table 1.

Comparative Example 2

A powdered green tea extract composition was obtained by the same procedure as in Example 6 except that the hot water treatment was not performed. After that, the resultant powdered green tea extract composition was analyzed, and then a packaged beverage was prepared by the same procedure as in Example 1, and subjected to the sensory test. The results are shown in Table 1.

Comparative Example 3

A catechin composition obtained by the method described in Example 2 of WO 2004/037022 A1, that is, by dissolving a green tea extract in a mixed solution of an organic solvent and water, and then bringing the resultant into contact with activated carbon and acid clay, followed by the removal of the organic solvent was concentrated and was subjected to spray drying to provide a powdered green tea extract composition. After that, the resultant powdered green tea extract composition was analyzed, and then a packaged beverage was prepared by the same procedure as in Example 1, and subjected to the sensory test. The results are shown in Table 1.

Comparative Example 4

A catechin composition was obtained in accordance with the description of Example 3 of WO 2004/037022 A1 except that, in Example 3 of WO 2004/037022 A1, the amount of activated carbon (KURARAY COAL GLC, manufactured by Kuraray Chemical Co., Ltd.) added to a filtrate was changed from 30 g to 50 g, and the amount of acid clay (MIZUKA ACE #600, manufactured by Mizusawa Industrial Chemicals, Ltd.) added was changed from 30 g to 55 g. That is, the catechin composition was obtained by the following method: a green tea extract was dissolved in a mixed solution of an organic solvent and water, and then the resultant was brought into contact with activated carbon and acid clay, followed by the removal of the organic solvent. Then, the resultant catechin composition was concentrated and was subjected to spray drying to provide a powdered green tea extract composition. After that, the resultant powdered green tea extract composition was analyzed, and then a packaged beverage was prepared by the same procedure as in Example 1, and subjected to the sensory test. The results are shown in Table 1.

TABLE 1

|  |  |  | Example | | | | | | |
|---|---|---|---|---|---|---|---|---|---|
|  |  |  | 1 | 2 | 3 | 4 | 5 | 6 | 7 |
| Analysis of green tea extract composition | (A) Non-polymer catechins | [mass %] | 35 | 35 | 38 | 34 | 34 | 38 | 38 |
|  | (B) Sugar | [mass %] | 10.7 | 6.4 | 7.3 | 10.6 | 10.5 | 9.5 | 9.5 |
|  | (C) Fe | [mass %] | 0.00024 | 0.00024 | 0.00028 | 0.00024 | 0.00023 | 0.00119 | 0.00066 |
|  | (D) Caffeine | [mass %] | 3.6 | 3.2 | 4.5 | 4.5 | 5.5 | 3.8 | 3.8 |
|  | (B) Sugar/(A) Non-polymer catechins | [—] | 0.309 | 0.183 | 0.194 | 0.309 | 0.309 | 0.250 | 0.252 |
|  | (D) Caffeine/(A) Non-polymer catechins | [—] | 0.103 | 0.091 | 0.120 | 0.131 | 0.160 | 0.099 | 0.101 |
|  | (C) Fe/(B) Sugar | [—] | 0.00002 | 0.00004 | 0.00004 | 0.00002 | 0.00002 | 0.00013 | 0.00007 |
|  | (D) Caffeine/(B) Sugar | [—] | 0.33 | 0.50 | 0.62 | 0.43 | 0.52 | 0.40 | 0.40 |
|  | (C) Fe/(D) Caffeine | [—] | 0.00007 | 0.00007 | 0.00006 | 0.00005 | 0.00004 | 0.00032 | 0.00017 |

TABLE 1-continued

|  |  |  |  |  |  |  |  |  |
|---|---|---|---|---|---|---|---|---|
|  | Ratio of gallate forms in non-polymer catechins | [mass %] | 41 | 51 | 52 | 41 | 41 | 55 | 54 |
| Evaluation | (E) Water content | [mass %] | 2.3 | 2.4 | 2.8 | 2.4 | 2.5 | 2.3 | 2.1 |
|  | Residual feeling |  | 1 | 1 | 2 | 2 | 2 | 3 | 1 |
|  | Bitterness |  | 1 | 1 | 3 | 3 | 3 | 2 | 1 |
|  | Change in color tone (Δa*) |  | 1.3 | 1.2 | 1.5 | 1.3 | 1.4 | 1.2 | 1.2 |

|  |  |  | Example |  |  |  |  |  |
|---|---|---|---|---|---|---|---|---|
|  |  |  | 8 | 9 | 10 | 11 | 12 | 13 |
| Analysis of green tea extract composition | (A) Non-polymer catechins | [mass %] | 37 | 35 | 35 | 41 | 33 | 32 |
|  | (B) Sugar | [mass %] | 9.3 | 10.7 | 10.7 | 7.8 | 10.4 | 13.0 |
|  | (C) Fe | [mass %] | 0.00055 | 0.00064 | 0.00083 | 0.00123 | 0.00117 | 0.00102 |
|  | (D) Caffeine | [mass %] | 3.6 | 3.6 | 3.6 | 3.9 | 3.6 | 3.2 |
|  | (B) Sugar/(A) Non-polymer catechins | [—] | 0.268 | 0.309 | 0.309 | 0.192 | 0.313 | 0.405 |
|  | (D) Caffeine/(A) Non-polymer catechins | [—] | 0.099 | 0.103 | 0.103 | 0.095 | 0.108 | 0.098 |
|  | (C) Fe/(B) Sugar | [—] | 0.00006 | 0.00006 | 0.00008 | 0.000157 | 0.00011 | 0.00008 |
|  | (D) Caffeine/(B) Sugar | [—] | 0.37 | 0.33 | 0.33 | 0.49 | 0.35 | 0.24 |
|  | (C) Fe/(D) Caffeine | [—] | 0.00015 | 0.00018 | 0.00023 | 0.00032 | 0.00032 | 0.00032 |
|  | Ratio of gallate forms in non-polymer catechins | [mass %] | 51 | 41 | 41 | 51 | 45 | 45 |
| Evaluation | (E) Water content | [mass %] | 2.2 | 2.5 | 2.8 | 7.5 | 9.3 | 9.0 |
|  | Residual feeling |  | 2 | 2 | 3 | 4 | 3 | 2 |
|  | Bitterness |  | 1 | 2 | 3 | 3 | 3 | 2 |
|  | Change in color tone (Δa*) |  | 1.7 | 1.6 | 1.6 | 3.4 | 5.8 | 5.6 |

|  |  |  | Example |  | Comparative Example |  |  |  |
|---|---|---|---|---|---|---|---|---|
|  |  |  | 14 | 15 | 1 | 2 | 3 | 4 |
| Analysis of green tea extract composition | (A) Non-polymer catechins | [mass %] | 37 | 29 | 32 | 32 | 64 | 43 |
|  | (B) Sugar | [mass %] | 6.1 | 10.5 | 6.6 | 7.0 | 7.0 | 13.0 |
|  | (C) Fe | [mass %] | 0.00053 | 0.00084 | 0.00120 | 0.00072 | 0.00043 | 0.00100 |
|  | (D) Caffeine | [mass %] | 3.7 | 2.5 | 4.1 | 5.9 | 1.8 | 2.5 |
|  | (B) Sugar/(A) Non-polymer catechins | [—] | 0.166 | 0.361 | 0.209 | 0.217 | 0.108 | 0.300 |
|  | (D) Caffeine/(A) Non-polymer catechins | [—] | 0.101 | 0.086 | 0.129 | 0.183 | 0.028 | 0.057 |
|  | (C) Fe/(B) Sugar | [—] | 0.00009 | 0.00008 | 0.00018 | 0.00010 | 0.00006 | 0.00008 |
|  | (D) Caffeine/(B) Sugar | [—] | 0.61 | 0.24 | 0.62 | 0.84 | 0.26 | 0.19 |
|  | (C) Fe/(D) Caffeine | [—] | 0.00014 | 0.00034 | 0.00029 | 0.00012 | 0.00024 | 0.00041 |
|  | Ratio of gallate forms in non-polymer catechins | [mass %] | 44 | 38 | 41 | 50 | 45 | 50 |
| Evaluation | (E) Water content | [mass %] | 2.0 | 7.0 | 3.4 | 4.5 | 1.4 | 7.6 |
|  | Residual feeling |  | 3 | 2 | 5 | 5 | 1 | 2 |
|  | Bitterness |  | 3 | 2 | 4 | 5 | 1 | 3 |
|  | Change in color tone (Δa*) |  | 1.8 | 5.0 | 2.0 | 2.8 | 10.0 | 8.4 |

The following findings were obtained from Table 1. That is, when the mass ratio between the sugar (B) and the iron (C), [(C)/(B)], and the mass ratio between the sugar (B) and the caffeine (D), [(D)/(B)], are excessively high, the resultant green tea extract composition is satisfactory in terms of suppression of a change in color tone during storage, whereas it is insufficient in taste and flavor owing to strong residual feeling and bitterness (Comparative Examples 1 and 2). Meanwhile, when the content of the non-polymer catechins (A) is excessively high, or when the mass ratio between the sugar (B) and the caffeine (D), [(D)/(B)], is excessively low, the resultant green tea extract composition is satisfactory in terms of taste and flavor by virtue of reduced residual feeling and bitterness in the mouth, whereas it is insufficient in suppression of a change in color tone during storage (Comparative Examples 3 and 4). In contrast, when the respective contents of the non-polymer catechins (A) and the sugar (B), the mass ratio between the sugar (B) and each of the iron (C) and the caffeine (D), as well as the water content are controlled to specific amounts, the resultant green tea extract composition not only has satisfactory taste and flavor by virtue of reduced residual feeling and bitterness, but also hardly exhibits a change in color tone during storage (Examples 1 to 15).

Respective components described in Formulation Examples 1 to 3 below were mixed to prepare instant beverage powders having green tea extract compositions blended therein.

Formulation Example 1

Instant Green Tea Beverage Powder

| | |
|---|---|
| Green tea extract composition obtained in Example 1 | 30 mass % |
| Dextrin | 68 mass % |
| Sodium ascorbate | 2 mass % |

Formulation Example 2

Instant Black Tea Beverage Powder

| | |
|---|---|
| Green tea extract composition obtained in Example 1 | 30 mass % |
| Powdered black tea extract | 5 mass % |
| Dextrin | 63 mass % |
| Sodium ascorbate | 2 mass % |

Formulation Example 3

Instant Oolong Tea Beverage Powder

| | |
|---|---|
| Green tea extract composition obtained in Example 1 | 30 mass % |
| Powdered oolong tea extract | 5 mass % |
| Dextrin | 63 mass % |
| Sodium ascorbate | 2 mass % |

The invention claimed is:

1. A green tea extract composition, comprising components (A), (B), (C), and (D):
   (A) at least one non-polymer catechin;
   (B) a sugar;
   (C) iron; and
   (D) caffeine,
   the green tea extract composition having:
   a content of said at least one non-polymer catechin (A) of from 25 to 45 mass %;
   a content of sugar (B) of from 6 to 13 mass %;
   a mass ratio between sugar (B) and iron (C), [(C)/(B)], of from 0.000005 to 0.00014;
   a mass ratio between sugar (B) and caffeine (D), [(D)/(B)], of from 0.2 to 0.7; and
   a water content (E) of 10 mass % or less.

2. The green tea extract composition according to claim 1, wherein a mass ratio between iron (C) and caffeine (D), [(C)/(D)], is from 0.00003 to 0.00045.

3. The green tea extract composition according to claim 1, wherein a content of iron (C) is from 0.00001 to 0.0016 mass %.

4. The green tea extract composition according to claim 1, wherein a mass ratio between said at least one non-polymer catechin (A) and sugar (B), [(B)/(A)], is from 0.1 to 0.5.

5. The green tea extract composition according to claim 1, wherein a mass ratio between said at least one non-polymer catechin (A) and caffeine (D), [(D)/(A)], is from 0.04 to 0.17.

6. The green tea extract composition according to claim 1, wherein a ratio of gallate forms in said at least one non-polymer catechin is from 30 to 57 mass %.

7. The green tea extract composition according to claim 1, wherein a content of said at least one non-polymer catechin (A) is from 27 to 44 mass %.

8. The green tea extract composition according to claim 1, wherein each of said at least one non-polymer catechin (A) is selected from the group consisting of epigallocatechin gallate, gallocatechin gallate, epicatechin gallate, catechin gallate, epigallocatechin, gallocatechin, epicatechin, and catechin.

9. The green tea extract composition according to claim 1, wherein a content of sugar (B) is from 6.5 to 12.5 mass %.

10. The green tea extract composition according to claim 1, wherein sugar (B) is at least one member selected from the group consisting of glucose, fructose and sucrose.

11. The green tea extract composition according to claim 1, wherein a content of caffeine (D) is from 2 to 6 mass %.

12. The green tea extract composition according to claim 1, wherein an absolute value ($\Delta a^*$) of a difference between the $a^*$ value of the green tea extract composition after storage at 55° C. for 14 days, and the $a^*$ value of the green tea extract composition before the start of the storage is less than 6.

13. A packaged beverage, comprising the green tea extract composition of claim 1 blended therein.

14. An instant beverage powder, comprising the green tea extract composition of claim 1 blended therein.

15. A green tea extract composition, comprising components (A), (B), (C), and (D):
   (A) at least one non-polymer catechin;
   (B) a sugar;
   (C) iron; and
   (D) caffeine,
   the green tea extract composition having:
   a content of said at least one non-polymer catechin (A) of from 25 to 45 mass %;
   a content of sugar (B) of from 6 to 13 mass %;
   a mass ratio between sugar (B) and iron (C), [(C)/(B)], of from 0.000005 to 0.00014;
   a mass ratio between sugar (B) and caffeine (D), [(D)/(B)], of from 0.2 to 0.7;
   a mass ratio between said at least one non-polymer catechin (A) and caffeine (D), [(D)/(A)], of from 0.04 to 0.17; and
   a water content (E) of 10 mass % or less,
   wherein an absolute value ($\Delta a^*$) of a difference between the $a^*$ value of the green tea extract composition after storage at 55° C. for 14 days, and the $a^*$ value of the green tea extract composition before the start of the storage is less than 6.

* * * * *